(12) United States Patent
Halter et al.

(10) Patent No.: US 8,397,206 B2
(45) Date of Patent: Mar. 12, 2013

(54) XML BOARD SUPPORT CUSTOMIZATION

(75) Inventors: Steven L. Halter, Rochester, MN (US);
Adam D. Dirstine, Rochester, MN (US);
David J. Hutchison, Rochester, MN (US); Pamela A. Wright, Rochester, MN (US); Jeffrey M. Ryan, Byron, MN (US)

(73) Assignee: Digi International Inc., Minnetonka, MN (US)

( * ) Notice: Subject to any disclaimer, the term of this patent is extended or adjusted under 35 U.S.C. 154(b) by 1579 days.

(21) Appl. No.: 11/777,870

(22) Filed: Jul. 13, 2007

(65) Prior Publication Data

US 2009/0019423 A1  Jan. 15, 2009

(51) Int. Cl.
*G06F 9/44* (2006.01)

(52) U.S. Cl. ......... 717/100; 717/104; 717/105; 717/109

(58) Field of Classification Search .................... None
See application file for complete search history.

(56) References Cited

U.S. PATENT DOCUMENTS

| | | | |
|---|---|---|---|
| 6,754,882 B1 | 6/2004 | Sanchez et al. | |
| 6,996,796 B2 | 2/2006 | Sanchez et al. | |
| 7,761,845 B1 * | 7/2010 | Perrin et al. | 717/109 |
| 8,069,434 B2 * | 11/2011 | Ploesser et al. | 717/104 |
| 8,117,587 B1 * | 2/2012 | Testardi | 717/100 |
| 2003/0140333 A1 * | 7/2003 | Odaka et al. | 717/115 |
| 2003/0200532 A1 | 10/2003 | Gensel | |
| 2004/0003388 A1 | 1/2004 | Jacquemot et al. | |
| 2004/0194022 A1 | 9/2004 | Cleraux et al. | |
| 2005/0177816 A1 * | 8/2005 | Kudukoli et al. | 717/105 |
| 2008/0320436 A1 * | 12/2008 | Hughes | 717/100 |

OTHER PUBLICATIONS

Digi International Inc., Digi ESP for Python Development Environment, 2012, 4 pages, <http://ftp1.digi.com/support/documentation/90001308_A.pdf>.*
Digi International Inc., Digi Applicaion Development Kit for Android, 2012, 2 pages, <http://www.digi.com/pdf/fs_androidappdevkit.pdf>.*

* cited by examiner

*Primary Examiner* — Thuy Dao
(74) *Attorney, Agent, or Firm* — Fogg & Powers LLC

(57) ABSTRACT

A markup language file comprises software build options usable to determine at least one software build configuration setting. One or more software build options are specified in a markup language file to specify one or more software build configuration settings for use in compilation of software. The markup language is an XML file, is editable in an Integrated Development Environment such as via a Graphical User Interface, and includes settings specific to an embedded processor system configuration.

17 Claims, 4 Drawing Sheets

```
<Configuration
    cflags=""
    asmflags="-Wa,--defsym,__GNU__=1 -Wa,--defsym,NETOS_GNU_TOOLS=1
-Wa,--defsym,NET_OS=1 -Wa,--defsym,NET_WORKS=1 -Wa,--
defsym,_POSIX_SOURCE=1 -Wa,-EB"
    linkoptions=" -T
$(NETOSDIR)/src/bsp/platforms/$(PLATFORM)/image.ld
$(NETOS_BSPLIBPATH)/reset.o $(NETOS_BSPLIBPATH)/memcpy.o ${STARTFILE}
-Wl,--start-group $(APP_LIBS) $(STD_CLIBS) -Wl,--end-group -Wl,
-Map,image.map "
    makefilerule="noipsecrule"
    bspbuilddebugparameter="BUILD_BOOTLOADER=FALSE"
    bspbuildreleaseparameter="BUILD_BOOTLOADER=TRUE"
    >
    <makefilevar value="STD_CLIBS = -L $(NETOSDIR)/lib/32b/gnu -lc -
lgcc -lm -lstdc++"/>
    <symbol value="__GNU__"/>
    <library path="$(NETOS_BSPLIBPATH)/libbsp.a"/>
    <include path="${NETOSDIR}/h"/>
    <option name="File System" type="boolean"
id="includeFilesystemCLib">
        <location>
            <file path="BSPPLATFORMDIR" name="bsp.h"
tagtype="define" tagname="BSP_INCLUDE_FILESYSTEM_FOR_CLIBRARY"/>
        </location>
        <library path="$(NETOS_LIBPATH)/libfilesys.a"/>
        <description>
            Set this constant to TRUE to have the BSP initialize
the                 file system
            according to configuration values in
            startfilesystem.c, and enable
            the C Library file I/O functions as well as the file
            system's native
            API.
        </description>
    </option>
```

```
<Configuration
    cflags=""
    asmflags=" -Wa,--defsym,__GNU__=1 -Wa,--defsym,NETOS_GNU_TOOLS=1
-Wa,--defsym,NET_OS=1 -Wa,--defsym,NET_WORKS=1 -Wa,--
defsym,_POSIX_SOURCE=1 -Wa,-EB"
    linkoptions=" -T
$(NETOSDIR)/src/bsp/platforms/$(PLATFORM)/image.ld
$(NETOS_BSPLIBPATH)/reset.o $(NETOS_BSPLIBPATH)/memcpy.o  ${STARTFILE}
-Wl,--start-group $(APP_LIBS) $(STD_CLIBS) -Wl,--end-group -Wl,
-Map,image.map "
    makefilerule="noipsecrule"
    bspbuilddebugparameter="BUILD_BOOTLOADER=FALSE"
    bspbuildreleaseparameter="BUILD_BOOTLOADER=TRUE"
    >
    <makefilevar value="STD_CLIBS = -L $(NETOSDIR)/lib/32b/gnu -lc -
lgcc -lm -lstdc++"/>
    <symbol value="__GNU__"/>
    <library path="$(NETOS_BSPLIBPATH)/libbsp.a"/>
    <include path="${NETOSDIR}/h"/>
    <option name="File System" type="boolean"
id="includeFilesystemCLib">
        <location>
            <file path="BSPPLATFORMDIR" name="bsp.h"
tagtype="define" tagname="BSP_INCLUDE_FILESYSTEM_FOR_CLIBRARY"/>
        </location>
        <library path="$(NETOS_LIBPATH)/libfilesys.a"/>
        <description>
            Set this constant to TRUE to have the BSP initialize
the             file system
            according to configuration values in
            startfilesystem.c, and enable
            the C Library file I/O functions as well as the file
            system's native
            API.
        </description>
    </option>
```

*FIG. 1*

```xml
<device name="ConnectCore 9C"
    type="connectcore9c_a"
    chip="NS9360"
    cflags="-mbig-endian -mcpu=arm9tdmi -fno-builtin"
    asmflags=""
    linkoptions="-mbig-endian -nostartfiles -mcpu=arm9tdmi">
    <makefilevar value="PROCESSOR=arm9"/>
    <makefilevar value="NETOS_LIBPATH =
    $(NETOSDIR)/lib/$(PROCESSOR)/32b/gnu"/>
    <symbol value="PROCESSOR=ns9360"/>
    <library path="$(NETOS_LIBPATH)/libgdb.a"/>
    <include path="${NETOSDIR}/h/arm9"/>
    <optionref id="includeFilesystemCLib"/>
    <option name="Serial Port B multiplexing"
type="string_list" id="serialportbmux">
        <location>
            <file path="BSPPLATFORMDIR" name="gpio.h"
            tagtype="define"
            tagname="BSP_GPIO_MUX_SERIAL_B"/>
        </location>
        <list>
            <item name="Internal use only"
            value="BSP_GPIO_MUX_INTERNAL_USE_ONLY"/>
            <item name="2 wire UART"
            value="BSP_GPIO_MUX_SERIAL_2_WIRE_UART"/>
            <item name="4 wire UART"
            value="BSP_GPIO_MUX_SERIAL_4_WIRE_UART"/>
            <item name="SPI application"
            value="BSP_GPIO_MUX_SERIAL_SPI_APP"/>
        </list>
        <selection type="XOR"/>
        <description>
            This directive controls how Serial Port B is
            multiplexed.
            The signals can stay internal (allowing GPIO or other special functions to multiplex) or can be
            routed to GPIO
            pins based on the particular serial configuration.
        </description>
```

*FIG. 2*

```xml
<template name="Application Builder" path="appbuilder"
id="appbuilder" category="appbuilder">
    <symbol value="APP_FILE_SYSTEM" />
    <library path="$(NETOS_LIBPATH)/libftpsvr.a" />
    <library path="$(NETOS_LIBPATH)/libemailc.a" />
    <library path="$(NETOS_LIBPATH)/libtelnsvr.a"/>
    <library path="$(NETOS_LIBPATH)/librphttpd.a" />
    <library path="$(NETOS_LIBPATH)/libmanapi.a" />
    <library path="$(NETOS_LIBPATH)/libssl.a" />
    <library path="$(NETOS_LIBPATH)/libcrypto.a" />
    <include path="${NETOSDIR}/src/bsp/h" />
    <setoption id="includeFilesystemCLib" value="TRUE" />
    <setoption id="includeCLI1" value="TRUE"/>
    <setoption id="includeCLIInBsp" value="TRUE"/>
    <setoption id="includeCLITELNET" value="TRUE"/>
    <setoption id="includeCLISERIAL" value="FALSE"/>

<option name="CPU Load Monitor" type="boolean"
id="CPU_MONITOR_SERVER_ENABLED">
        <location>
            <file path="PROJECTDIR/sys"
            name="appservices.h" tagtype="define"
            tagname="CPU_LOAD_MEASURING"/>
        </location>
        <description>
                    Turn this option on to enable
        monitoring of the CPU load through the Web UI.
        Enabling the monitor
        delays the startup time by approximately 10 seconds
        while an idle cpu baseline is established.
        </description>
    </option>
    <option name="Web Server" type="boolean"
id="HTTP_SERVER_ENABLED">
        <location>
            <file path="PROJECTDIR/sys"
            name="appservices.h" tagtype="define"
            tagname="HTTP_SERVER_ENABLED"/>
        </location>
        <description>
        Turn this option on to enable the HTTP server.
        </description>
    </option>
... additional options not shown
</template>
```

*FIG. 3*

XML BOARD SUPPORT CUSTOMIZATION

FIELD OF THE INVENTION

The invention relates generally to configuration of computer system boards, and more specifically to customization of a board support package using an XML file.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computerized devices often use similar processors and circuits to perform different tasks, relying on the general-purpose nature of many processors to provide a relatively inexpensive and fast means to produce a specialized computerized device. Some processors are specifically designed to be embedded in customized applications, and include a wide variety of features such as analog and digital inputs and outputs, network support, and specialized software libraries supporting such features to make software design for such systems relatively easy.

Some such systems are called embedded systems, reflecting that a processor or computerized system is embedded in the system to perform a specific task, which distinguishes an embedded system from a general-purpose computer that usually lacks the software and hardware configured to perform one or more specific tasks in a specific embedded environment. Examples of embedded systems include controllers for industrial processes, remote monitoring and sensing systems, as well as handheld devices such as cell phones and personal digital assistants. Although some of these devices such as personal digital assistants often include general-purpose software execution among their features, their construction and configuration resembles that of traditional embedded system devices and so they are often considered embedded systems.

Embedded systems can also often be customized to a greater extent than general-purpose computers, discarding hardware components and software drivers not used in a specific application of an embedded system. Embedded processor providers typically provide support for a variety of hardware through very robust software packages supporting a variety of different configurations, such as USB, analog, network, serial, analog-to digital, digital-to-analog, and other interfaces. It is therefore desirable to manage the hardware and software support included in a specific board configuration.

SUMMARY

One example embodiment of the invention comprises a markup language file comprising software build options usable to determine at least one software build configuration setting. In another embodiment, a method of configuring software for an embedded processor system comprises using one or more software build options specified in a markup language file to specify one or more software build configuration settings for use in compilation of software. The markup language in various embodiments is an XML file, is editable in an Integrated Development Environment such as via a Graphical User Interface, and includes settings specific to an embedded processor system configuration.

BRIEF DESCRIPTION OF THE FIGURES

FIG. 1 shows an XML configuration file, as may be used to practice some embodiments of the invention.

FIG. 2 shows an XML configuration file, as may be used to practice some embodiments of the invention.

FIG. 3 shows an XML configuration file, as may be used to practice some embodiments of the invention.

DETAILED DESCRIPTION

Figure 4:
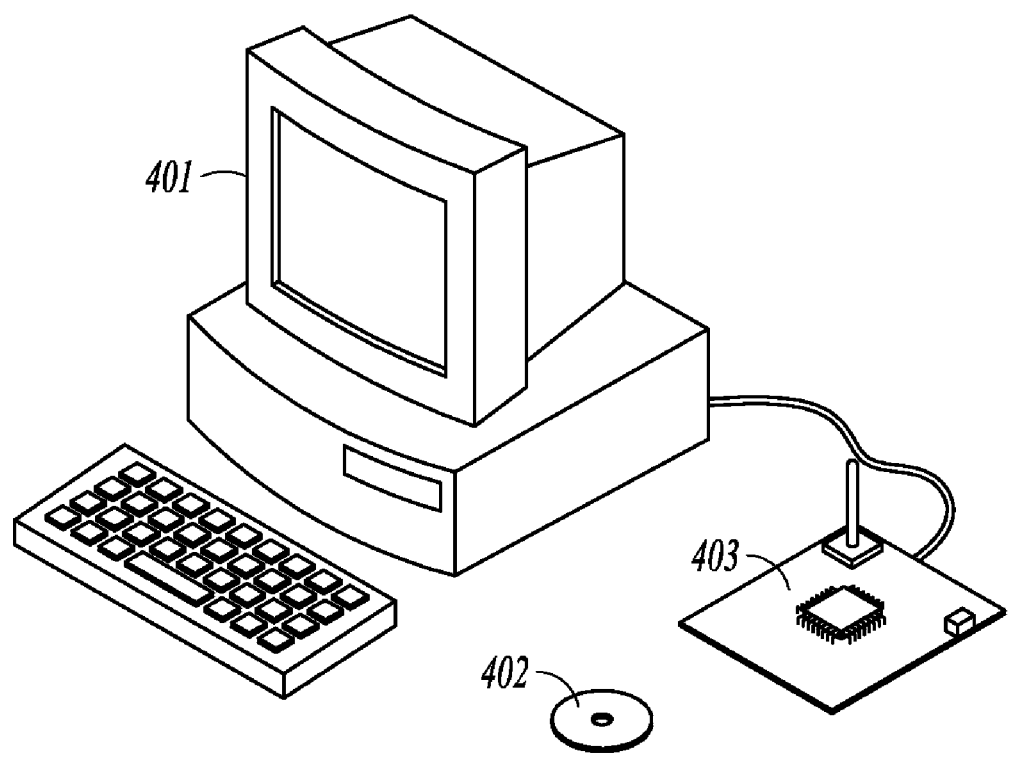
FIG. 4 shows a system comprising a personal computer 401, a machine-readable medium comprising an Integrated Development Environment and a markup language file, and an embedded processor system, consistent with an example embodiment of the invention.

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

Embedded systems including processors and associated hardware configured to perform a specific function are used to make a variety of common devices, including medical devices, aviation instrumentation, home automation products, communications devices such as routers, handheld computers such as personal digital assistants and cell phones, video game systems, industrial control systems, automotive computers, and a wide variety of other such computerized devices.

Although many of these systems could be easily built using the same embedded processor, the hardware around the processor will likely differ from application to application. A router, for example, will likely have several wired network ports, but will not have wireless network capability or other data interfaces. An industrial controller might have a variety of analog-to-digital converter inputs to digitize analog signals being sensed, and provide control output via a digital-to-analog converter, but may not include any network functionality or USB ports.

Design of embedded systems such as these typically involves use of a prototype or evaluation circuit board having the desired hardware incorporated into the circuit, along with an integrated development environment (IDE) including software support for a wide variety of hardware devices that are supported by the embedded processor provider. The IDE typically includes a source code editor and a compiler, as well as a variety of libraries of functions to provide easier programmer interface to various hardware elements such as networking, USB, and other interfaces. The program segments are sometimes provided as part of what is known as a software development kit (SDK), which can include application programming interface (API), dynamic linked library (DLL), and other support for referencing external software or system services from a computer program. This makes it easier for a programmer to quickly and efficiently write software that uses a variety of different hardware components, without having to learn or program common functions of the various hardware components.

In one such example, a programmer using a wireless network interface can use pre-existing software provided as a part of the software development kit to perform functions such as setting the IP address of a network device or configuring wireless network encryption by specifying certain configuration information, and does not need to write the actual software that manages the wireless network connection and provides a TCP/IP interface to other software.

But, it is sometimes difficult to ensure that the proper provided software is included in a program, or to ensure that the software provided or that is indicated as available to the programmer in the SDK or IDE is associated with hardware that is included in the specific configuration on which the programmer is designing software to run. For example, an embedded system that includes a wireless network interface but not a wired or Ethernet interface does not need drivers for a wired Ethernet port included in the completed application, but needs a network stack such as TCP/IP and needs drivers for the wireless network interface. Managing this information to ensure that the right software is included or linked to the program under development when it is compiled is made easier in an embodiment of the invention by using an XML file to configure a board support package so that the hardware-specific program configuration and code is included when needed.

Prior board support packages used documentation to describe the various hardware options, and the associated software and configuration parameters. Changing these settings relied on the programmer to either manipulate the configuration files manually, such as by using an editor to find and change the settings in various configuration files, or use a software configuration tool such as the IDE to make configuration changes. In some software configuration tool examples, all changes made to the configuration must be made via the configuration tool as the resulting configuration data is stored in a proprietary format that isn't user-readable. In other examples, the user can either manually edit the configuration files, or can start over and make a new set of configuration files using the support tools.

Some embodiments of the invention seek to make management of this type of configuration information easier by using a programmer-readable XML file to store board support information for a specific project or board configuration, making it easy to change the configuration by editing the XML file directly or by using the IDE to make changes to the XML file. The parameters set via the XML file are presented in the IDE in some embodiments via a graphical user interface, such as a menu having selection boxes, radio buttons, and prompts for configuration information.

In one such example, a wireless network button is made available based on the board configuration's incorporation of wireless networking hardware as indicated in the XML file provided with the IDE. In another example, the presence of the wireless networking hardware is detected by the IDE, or can be configured by the programmer so that a board lacking certain hardware can be used to develop software for an embedded system that will include the hardware or other different configuration.

In this example, a variety of wireless networking parameters are selectable via the IDE once the wireless network button is selected, including IP address selection, wireless encryption method and key, and other such configuration parameters. These can be entered easily via the IDE without having to find a specific wireless networking-specific configuration file, and can further be read and modified in a single XML file that is used to configure other hardware on the board. By modeling the board support package configuration in XML, the IDE can refer to a single representation of the board configuration in the XML file, which contains the content and relationships between configuration elements. Details of the board support package are therefore managed via a single interface and a single XML configuration file, even in embodiments where the XML information is used by the IDE or compiler to configure other files such as board support package variables, build options, template applications, and makefiles based on the configuration information specified in the XML file.

FIG. 1 illustrates a portion of an example XML file, consistent with an example embodiment of the invention. XML stands for eXtensible Markup Language, is a markup language that combines both text data and information about the text data interspersed with the text data. As shown in FIG. 1, the XML file includes a variety of parameter names as well as settings or text associated with those names. The Integrated Development Environment (IDE) the programmer uses to create software and configure the board uses the XML file to read the various settings available for a particular board or system in the XML file, and uses these parameters to configure the board or in compiling software. The settings and parameters specified in the XML file are in some embodiments specified in such a way that only options or settings appropriate to a particular board configuration are made available via the IDE, which substantially reduces the burden of board configuration to the programmer The XML file in some examples describes the options available for a particular board, but does not itself hold the configured values. For example, in FIG. 1, there is a configurable option called "File System". This is a boolean value that is stored in a source file called bsp.h located in the "BSPPLATFORMDIR" directory of the developer's computer system, using the tag BSP_INCLUDE_FILE-SYSTEM_FOR_CLIBRARY. When the board support package is created, the graphical user interface presented via the Integrated Development Environment displays a check box, indicating whether the File System option has been selected. If the box is checked, the IDE tool edits the bsp.h file and changes the tag to indicate that a file system is to be included. Alternately, the user can manually edit the bsp.h file to make the change, and the IDE will recognize the changed setting when reading the tag specified in the XML file and indicate that a file system has been selected as an option.

For example, line 11 of FIG. 1 includes a makefilerule that is applied when building a make file, or when compiling a program into executable code, and in this example instructs the compiler whether to include IPSec security protocol software for supporting a certain type of security over Internet Protocol connections with the markup language instruction makefilerule="noipsecrule". This parameter can be set by deselecting an IPSec button in a network configuration screen presented to a programmer working with a board that has a network interface, or can be manually added or removed by editing the configuration files identified in the XML file directly. Because the XML file identifies the individual files that can also be manually edited, changes made via one method will be observable and changeable via the other, eliminating the need to manage multiple configuration files and compiler settings in different locations in completing a project.

The example of FIG. 1 illustrates a variety of settings used in compiling a real-time operating system (RTOS, or real-time OS), including the network support example previously discussed as well as other setting such as debugging settings and the location of various files used in compiling the operating system. In this example, the settings made in the XML file of FIG. 1 are settings that are specific to a NET+OS operating system, and are applicable to all board types that use this operating system. Other portions of the XML file, or in some embodiments other XML files, are used to configure other settings and to provide other information, as shown in FIG. 2.

FIG. 2 illustrates a portion of an XML file for a particular board configuration, including board-specific variables and build options, consistent with an example embodiment of the invention. The file identifies the device as a ConnectCore 9C board, operating with big-endian data and an ARM9TDI processor. Support files and parameters for various serial ports, UART interface chips, and other hardware are specified, along with other board-specific parameters.

Similarly, FIG. 3 illustrates a portion of an XML file for a specific program or application, consistent with an example embodiment of the invention. A variety of library paths are specified, identifying software code libraries for performing functions used in the application such as operating and FTP server, communicating e-mail, inclusion of a CPU load monitor, and using SSL and other software-level encryption services. Some parts of the XML file include comments as well as parameters and settings, such as the description of the CPU Load Monitor function, which can be used to make it easier to manually edit the XML file, or can be imported into a graphical user interface presentation as a description field for the relevant configuration option. Much like the operating system-specific settings of FIG. 1, the application settings in FIG. 3 may be applicable to more than one board type.

The Integrated Development Environment in this example guides the program developer through selecting various settings in the three levels of configuration represented by the XML files illustrated and described in FIGS. 1-3, and uses the selected settings to create an embedded application.

In some embodiments, the XML file provided identifies all settings applicable to any board configuration for a specific board type, processor, or family, and only those portions of the XML file relevant to the particular board configuration are displayed in the IDE graphical environment. For example, the XML file may contain a variety of Ethernet, wireless network, Internet protocol, network security, and other networking configuration settings, but the IDE will not present them to a user working on a project for a board that does not have network capability.

The various levels of configuration options illustrated in these three applications show how build options such as compiler and linker options, libraries, and operating system features can be identified via an XML markup language file, and can be understood and edited by working directly with the configuration files or by working with the configuration file data specified in an XML file through a graphical user interface in an Integrated Development Environment. Because option changes are automatically saved to the appropriate configuration files when changed in the IDE, the chances for error in managing settings across a large number of configuration files, compiler settings, and other project elements is reduced. Further, understanding the structure and operation of the features available is enhanced by the relatively easy readability of the XML file, and by integrating the settings stored there with presentation of a hierarchy of settings made selectively available in the IDE.

The underlying structure of the integrated development environment, such as the libraries of code and the various configuration files used in a project can remain as they were in some embodiments, so that the original structure of the programming environment remains compatible with prior programming projects and is easily understood by experienced programmers. These settings are in some embodiments managed via a central XML file to make management of the settings more convenient and more easily understood, an so that the IDE can present the settings in a more useful way such as by requiring all needed settings be specified or ensuring that only available parameters are chosen.

FIG. 4 shows a system, comprising a personal computer 401, a machine-readable medium 402, and an embedded processor system 403. The machine-readable medium 402 is in some examples a compact disc or DVD, and is used to install an Integrated Development Environment (IDE), a markup language file, and other software onto personal computer 401. The personal computer 401 is then operable to run the installed Integrated Development Environment, to compile software developed in the IDE, and to work with the markup language file loaded onto the personal computer and comprising various software build options for one or more software projects. A software project is typically produced in the IDE, where it is written, compiled, and debugged before being loaded from the development environment on the personal computer onto the embedded processor system 403.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

We claim:

1. A method, executed by a processor, of configuring software for an embedded processor system, comprising:
providing an Integrated Development Environment (IDE) configured to work with a markup language file applicable to a board having a processor and one or more hardware configurations;
receiving the one or more software build options to be specified in the markup language file via the IDE;
setting, by the IDE, the one or more build options for the board having a first hardware configuration in the markup language file such that the markup language file can be manually edited;
using one or more software build options specified in the markup language file to specify one or more software build configuration settings for use in compilation of software compatible with the first hardware configuration of the board.

2. The method of configuring software for an embedded processor system of claim 1, wherein the one or more software build configuration settings comprise at least one of hardware support and operating system configuration options.

3. The method of configuring software for an embedded processor system of claim 1, wherein the markup language file is an XML file.

4. The method of configuring software for an embedded processor system of claim 1, wherein the software build options set in the markup language file by the Integrated Development Environment are hardware configuration-specific.

5. The method of configuring software for an embedded processor system of claim 1, wherein the IDE detects the first hardware configuration, and provides a user with an option to specify a second configuration that includes a component that is not present in the first hardware configuration.

6. A non-transitory machine-readable medium, comprising:
   a markup language file comprising software build options usable to determine at least one software build configuration setting applicable to a board having a processor and one or more individual hardware configurations;
   an Integrated Development Environment (IDE) configured to detect a hardware component on the board, and to manipulate the markup language file such that a hardware-specific program configuration and code is available for a particular hardware configuration of the board; and
   a compiler configured to use the software build options specified in the markup language file to compile software compatible with the particular hardware configuration for the board;
   wherein the software build options are specified via the IDE, and the IDE is presented via a graphical user interface.

7. The non-transitory machine-readable medium of claim 1, wherein the software build options presented via the Integrated Development Environment are hardware configuration-specific.

8. The non-transitory machine-readable medium of claim 1, wherein the software build options comprise an embedded hardware system configuration.

9. The non-transitory machine-readable medium of claim 1, wherein the markup language file is an XML file.

10. The non-transitory machine-readable medium of claim 1, wherein the IDE detects a first hardware configuration, and provides a user with an option to specify a second configuration that includes a component that is not present in the first hardware configuration.

11. An Integrated Development Environment (IDE), stored in a non-transitory tangible machine-readable medium, comprising:
    a markup language file encoded on a machine-readable medium and comprising software build options usable to determine at least one software build configuration setting applicable to a board having a processor and one or more individual hardware configurations;
    a software configuration tool configured to detect the presence of a hardware component on the board, and to work with the markup language file such that a hardware-specific program configuration and code is available for a particular hardware configuration of the board; and
    a compiler configured to use the software build options specified in the markup language file to compile software compatible with the particular hardware configuration for the board;
    wherein the software build options are specified via the software configuration tool, and the software configuration tool is operable to allow a user to edit one or more software build options specified in the markup language file via a Graphical User Interface.

12. The Integrated Development Environment of claim 11, wherein the markup language file is an XML file.

13. The Integrated Development Environment of claim 11, wherein the Integrated Development Environment is operable to edit the markup language file.

14. The Integrated Development Environment of claim 11, wherein the one or more software build options the user is allowed to edit via the Graphical User Interface comprise options based on at least one of hardware configuration and operating system configuration of an embedded system.

15. The Integrated Development Environment (IDE) of claim 11, wherein the software configuration tool detects a first hardware configuration, and provides a user with an option to specify a second configuration that includes a component that is not present in the first hardware configuration.

16. An embedded processor system kit, comprising:
    a circuit comprising a processor and other components in a hardware board configuration;
    an Integrated Development Environment (IDE) configured to detect the presence of a hardware component of a specific hardware board configuration, and to work with the markup language file such that a hardware-specific program configuration and code is available for a particular hardware board configuration;
    a markup language file comprising software build options usable to determine at least one software build configuration setting, the markup language file editable via the Integrated Development Environment; and
    a compiler configured to use the software build options specified in the markup language file to compile software compatible with the particular hardware board configuration;
    wherein the software build options are specified via the IDE, and the IDE is presented via a Graphical User Interface.

17. The embedded processor system kit of claim 16, wherein the IDE detects a first hardware configuration, and provides a user with an option to specify a second configuration that includes a component that is not present in the first hardware configuration.

* * * * *